July 1, 1924.

E. FRANCIS

TIRE CHAIN SHOE

Filed Dec. 9, 1922

1,499,648

Inventor
Earl Francis
By Watson E. Coleman
Attorney

Patented July 1, 1924.

1,499,648

UNITED STATES PATENT OFFICE.

EARL FRANCIS, OF MINOT, NORTH DAKOTA.

TIRE-CHAIN SHOE.

Application filed December 9, 1922. Serial No. 605,857.

*To all whom it may concern:*

Be it known that I, EARL FRANCIS, a citizen of the United States, residing at Minot, in the county of Ward and State of North Dakota, have invented certain new and useful Improvements in Tire-Chain Shoes, of which the following is a specification, reference being had to the accompanying drawings.

This invention relates to traction means for tires, and more particularly to a tire chain shoe.

It is an object of the invention to provide a device of this character capable of being connected to a conventional form of tire chain and wherein the desired traction means is provided to prevent sagging or slipping of the tire when traveling in mud, sand or over ice.

It is another object of the invention to provide a device of this character comprising a plate curved in accordance with the curvature of the tread of a tire to permit application of the device to a tire regardless of the size of the tire.

It is also an object of the invention to provide a tire chain shoe of this character wherein the ends of the shoe terminate at the termination of the tread portion of the tire casing and is provided with means for connection to the conventional form of cross chains of a tire chain.

It is a further object of the invention to provide a tire shoe of this character including a plate curved in accordance with the curvature of the tread of a tire and having its ends reduced to provide means for connecting said shoe to tire chains, and wherein one face of the shoe is provided with traction means which occupies a considerable portion of said face.

With these and other objects in view, the invention consists in the improved construction and arrangement of parts to be hereinafter more particularly described, fully claimed and illustrated in the accompanying drawings, in which:—

Figure 1:
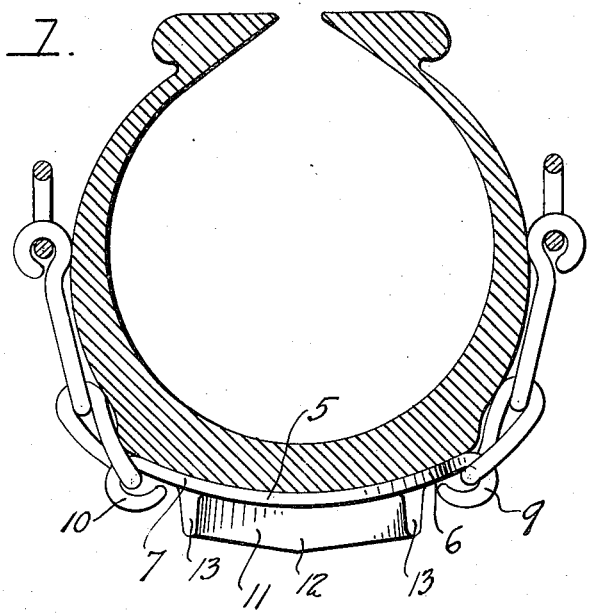
Figure 1 is a transverse sectional view of a tire casing showing the invention applied.
Figure 2:
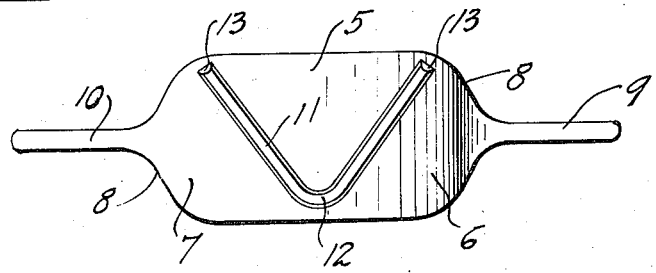
Figure 2 is a bottom plan view of the shoe showing the extension before the eyes are formed therefrom.
Figure 3:
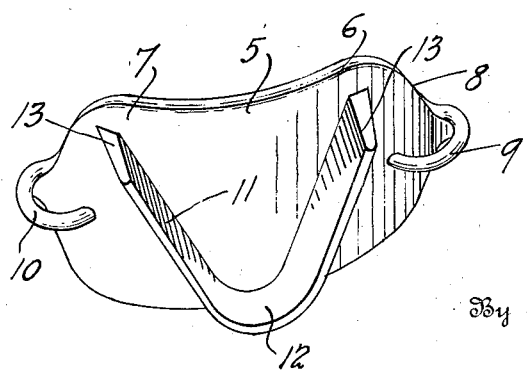
Figure 3 is a perspective view of the shoe.

Referring to the drawings, 5 designates a tire chain shoe consisting of a relatively narrow plate, the length of said plate substantially corresponding to the width of the tread of the average size of tire casing. Each of the end portions 6 and 7 is curved inwardly as at 8 to the central portion of the end, said central portion having an extension 9, said extension being substantially circular in cross section.

The plate 5 is curved longitudinally in accordance with the degree of curvature of the tread of a tire, so as to permit said plate to be engaged with the tread of any tire, regardless of its size. This is possible in view of the fact that the ends 6 and 7 of the plate do not extend beyond the junction of the tread of the tire casing with the side walls thereof. Each extension 9 is extended back upon the plate and toward the convex face of the plate to provide eyes 10, said eyes being relatively large so as to permit the plate to be connected to the conventional form of cross chains used in connection with tire chains and also to permit said eyes to serve as mud lugs in case the shoe should be embedded to any great extent in the ground. Each of the eyes 10 is disposed centrally of the end portions of the lower face of the plate, the lowest portion of each eye being disposed substantially flush with the greatest point of curvature of the plate.

Formed integral with and projecting from the lower or convex face of the plate 5 is a traction or mud lug 11. This lug is substantially V-shaped, the portion 12 of the lug being disposed adjacent the center of one longitudinal edge of the plate, while the opposite end portions 13 of the lug are disposed adjacent the end portions of the opposite longitudinal edge of the plate. In this way the single lug extends transversely of the plate and practically occupies the entire central portion of the plate. It will also be noted that the ends of the lug terminate adjacent the ends of the plate. The width of the lug is greater than the size of the eyes so as to permit said lug to project beyond the eyes. In view of this the eyes 10 are only used as traction means when the lug 11 and plate 5 are embedded in the ground.

This tire chain shoe may be used in connection with any conventional form of tire chain in view of its compact form and simple means of attachment. It may be also left on the tire when the tire is being inflated in view of the fact that the ends of the plate do not extend upwardly into engagement with the side walls of the tire casing.

This also permits the plate to be used on any tire regardless of its size. Any number of these devices may be applied or removed from the conventional form of tire chain, as occasion or condition of the ground requires. All of these features are possessed by a device which is simple in construction and compact in form and which provides a large traction surface for tires.

What is claimed is:—

A tire chain shoe consisting of a plate longitudinally curved in accordance with the degree of curvature of the tread of an average size tire, said plate being relatively narrow and having its end portions gradually reduced and continued by elongated extensions, each of said extensions being substantially circular in cross section and extended back upon the plate and toward each other to provide a relatively large eye and a traction lug formed integral with the convex face of the plate, said lug projecting beyond the eyes in spaced relation thereto, said eyes serving as mud lugs.

In testimony whereof I hereunto affix my signature.

EARL FRANCIS.